United States Patent [19]

Matsuda et al.

[11] Patent Number: 4,507,693
[45] Date of Patent: Mar. 26, 1985

[54] CONTROL APPARATUS FOR ROTATION TYPE STORAGE DEVICE

[75] Inventors: Toshihiko Matsuda, Owariasahi; Morihiko Takashi, Seto; Mistuo Yoshida, Owariasahi, all of Japan

[73] Assignee: Hitachi, Ltd., Tokyo, Japan

[21] Appl. No.: 369,648

[22] Filed: Apr. 19, 1982

[30] Foreign Application Priority Data

Apr. 20, 1981 [JP] Japan ................................ 56-60352

[51] Int. Cl.³ ............................................ G11B 5/012
[52] U.S. Cl. .................................................... 360/72.2
[58] Field of Search ........................................ 360/72.2

[56] References Cited

U.S. PATENT DOCUMENTS 3,375,507  3/1968  Gleim et al. ...................... 360/72.2
4,297,737 10/1981  Andresen et al. .................. 360/135

Primary Examiner—George G. Stellar
Attorney, Agent, or Firm—Antonelli, Terry & Wands

[57] ABSTRACT

A control apparatus for a rotation type magnetic storage device such as a magnetic disc device in which each of record tracks is composed of plural sectors, is disclosed. The apparatus comprises a memory for storing control information of address and the like of the sector to be accessed on a rotating recording medium and comparator means for comparing successively the control information read out from the sector of the rotating recording medium with the control information read out from the memory. In accordance with the output signal from the comparator, the sector of the rotating medium to be accessed is detected. The rotation type magnetic storage device having different sector formats can be controlled by altering correspondingly the control information stored in said memory.

13 Claims, 8 Drawing Figures

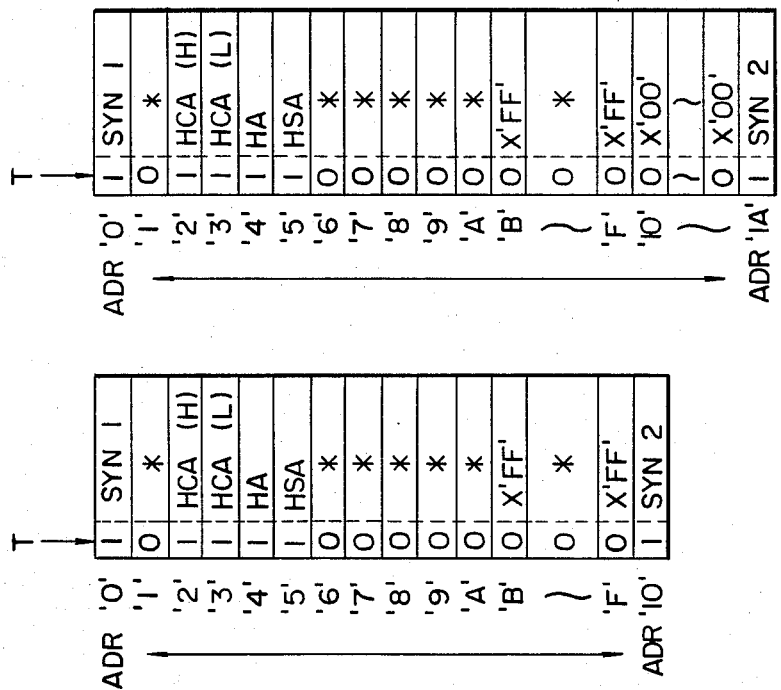
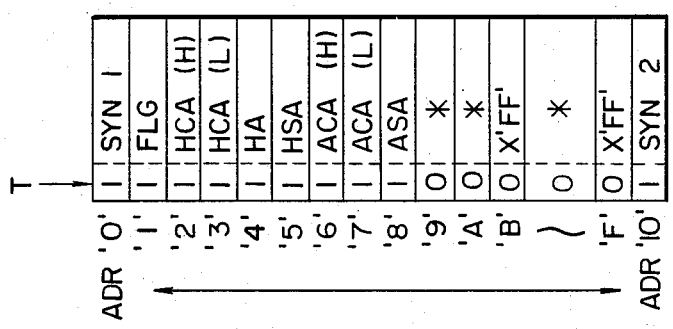
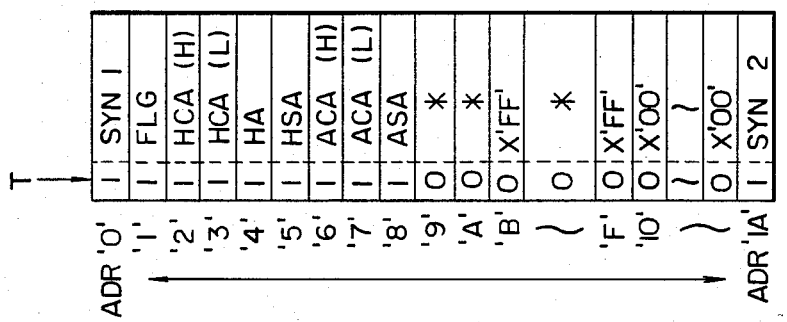

CONTROL APPARATUS FOR ROTATION TYPE STORAGE DEVICE

BACKGROUND OF THE INVENTION

The present invention relates to a control apparatus for a rotation type storage device. In particular, the present invention concerns a control apparatus for magnetic storage devices, such as magnetic disc storage devices, magnetic drum storages, floppy discs and the like, in which rotatable magnetic recording medium or media are employed.

The magnetic storage devices of this type are widely used in data processing systems for storing a large quantity of data. As is well known, a magnetic recording disc, for example, has a plurality of tracks each of which is divided into a number of regions each of a physically fixed length. The region is referred to as a sector. Writing-in and reading-out of data from and into the storage device are effected on the sector base.

In the case of a magnetic disc storage, for example, in which writing-in and reading-out of data are performed on the sector base as mentioned above, an upper or host device, such as an electronic computer and the like, usually furnishes the control apparatus of the magnetic disc storage device with control information concerning the record format of the concerned sector on the magnetic disc. In response thereto, the control apparatus controls the magnetic disc device in accordance with the control information including the sector address under command of the host device to thereby carry out the recording and/or retrieval of data on the sector base.

In most of the prior art magnetic disc storages, the record formats have usually been definitely and fixedly prepared for individual magnetic discs, respectively. Under the circumstances, when the recording and/or reproduction of data is to be effected for the magnetic discs whose record formats are different from one another, the control apparatus appropriate or compatible to the respective record formats have to be correspondingly configured and provided, involving enormous expenditure and labors.

SUMMARY OF THE INVENTION

An object of the present invention is therefore to provide a control apparatus for a rotary or rotation type storage device which is capable of easily dealing with the rotation type storage device in which different record formats are adopted for predetermined storage units, such as sectors or rotatable recording media.

Another object of the present invention is to provide a control apparatus for a rotation type storage device in which control information concerning a sector to be accessed on a rotating recording medium is stored in a memory and the sector to be accessed on the rotating recording medium is detected in accordance with the control information.

In view of the above and other objects which will be more apparent as description proceeds, there is provided according to a general aspect of the invention a control apparatus for a rotation type storage device, which comprises a memory for storing therein in a predetermined array the control information inclusive of address information concerning a predetermined storage unit, such as a sector to be accessed on a rotatable recording medium, an address register for designating addresses of the memory, and comparison means for comparing information read out from the rotating recording medium with the control information available from the memory. More specifically, each of the sectors has respective control information stored therein, wherein each control information read out of the concerned sector is then supplied to the comparator means to be compared with information outputted from the memory. Further, the content of the address register is sequentially updated for causing the memory to output the control information, whereby the sector of the rotating recording medium to be accessed is selected in accordance with the result of the comparison effected by the comparator means.

In the case where a rotary storage device of another type in which the sectors of the rotary recording medium have different record formats is to be used, the control information stored in the memory is correspondingly rewritten and the operation mentioned above is effected to control appropriately the storage device.

The control apparatus according to the invention can also be so arranged as to deal with a plurality of rotation type storage devices whose sectors have record formats different from one another storage devices by storing control information corresponding to the different storage devices in the memory.

BRIEF DESCRIPTION OF THE DRAWINGS

FIGS. 3A to 3D are views illustrating contents of a memory for storing control information in the control apparatus for the magnetic disc storage according to an exemplary embodiment of the invention.

DESCRIPTION OF THE PREFERRED EMBODIMENTS

Figure 1:
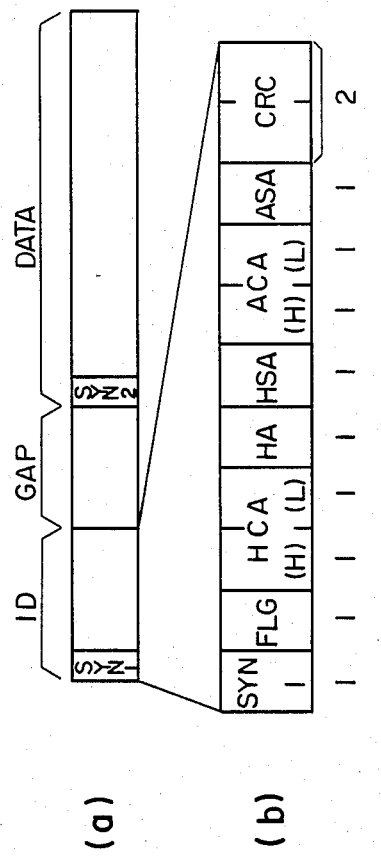
FIG. 1, including a and b, is a view illustrating a record format of a sector in a magnetic disc storage device according to an exemplary embodiment of the present invention.

Now, the invention will be described in detail in conjunction with an exemplary embodiment thereof with reference to a control apparatus for a magnetic disc storage device. As is well known, a magnetic disc of the magnetic disc storage device includes a number of tracks each of which is divided into a plurality of regions each having a physically fixed length and referred to as a sector, wherein the sectors are assigned respective addresses so that recording and retrieval of data can be effected on the sector base. FIG. 1 illustrates a general record format for a sector of a magnetic disc. As is shown at (a) in FIG. 1, each of the sectors is composed of an area for a sector identifying address ID, a gap area labelled GAP and an area for data labelled DATA. The sector address area ID serves for recording information of the address assigned to the sector. The data area DATA serves to record data to be transferred between a host device such as a central processing unit or the like. The gap area GAP serves to separate discriminately the data area DATA and the sector address area ID from each other.

Figure 2:
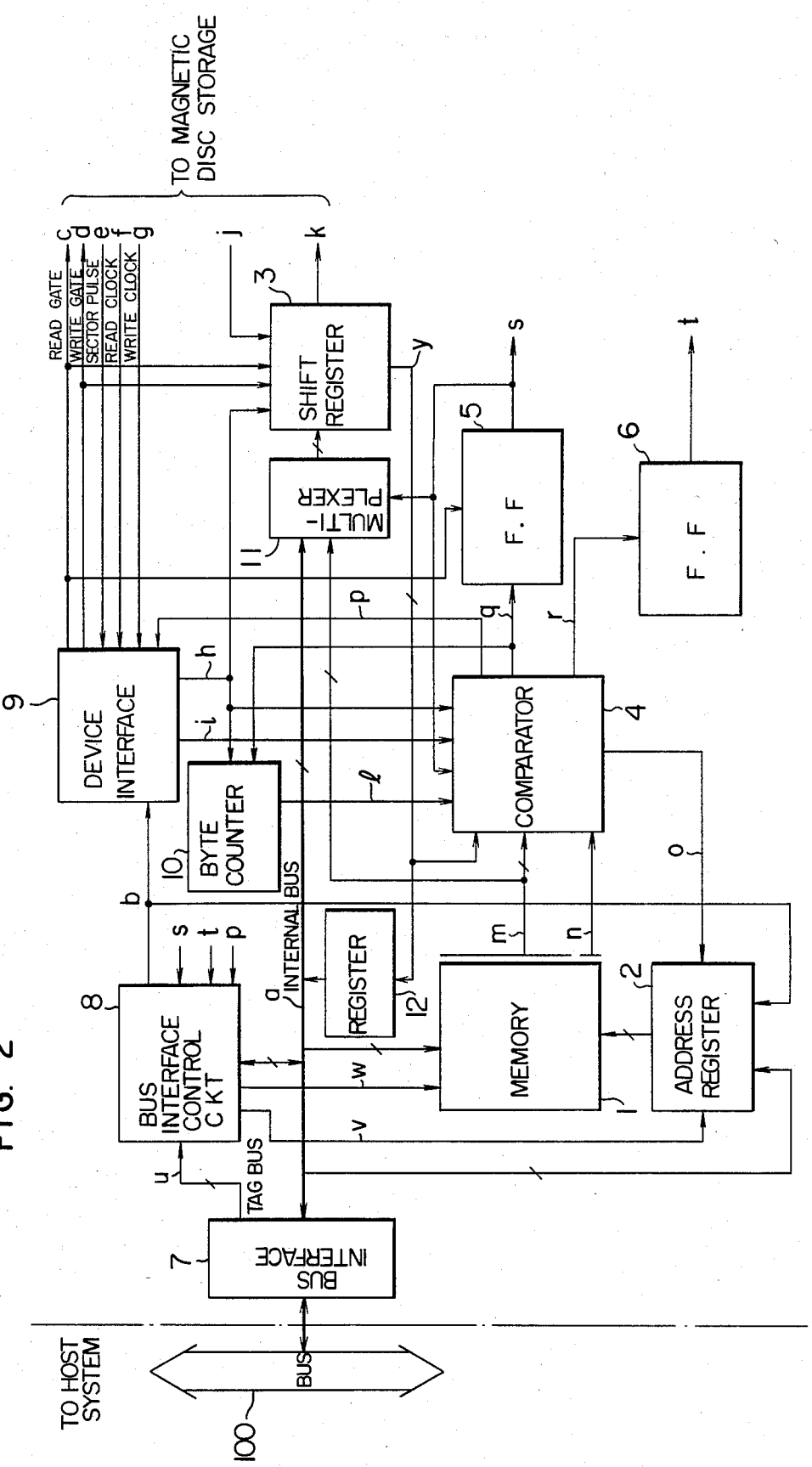
FIG. 2 shows in a block diagram a general arrangement of a control apparatus for the magnetic disc storage device according to an exemplary embodiment of the invention.

The sector identifying address area ID is destined to store various individual control information as is illustrated in FIG. 2 at (b), in which the mnemonics used are defined as follows:

SYN 1: control code indicative of the leading end of the sector address ID,

FLG: flag information indicative of the state of the concerned sector to be accessed, HCA: cylinder address of the concerned sector, HA: head address, HSA: address of the concerned sector, ACA: cylinder address of an alternate sector (or cylinder address of a sector alternatively replaced by the concerned sector; when alternate processing is being executed due to a defect in the cylinder address of the concerned sector, the cylinder address of the alternate sector is selected), ASA: alternate sector address of the alternate sector (or sector address of a sector alternatively replaced by the concerned sector: when the alternate processing is being executed due to the presence of defect in the sector address of the concerned sector, the alternate sector is selected), CRC: check code, and SYN 2: control code indicative of the leading of data stored in the data area DATA.

Each of numerals indicated below the individual control information labelled with the mnemonics defined above and shown at (b) in FIG. 1 represents the number of bytes of the associated information, respectively.

Referring to FIG. 2 which shows in a block diagram a general arrangement of a control apparatus for a magnetic disc storage device in which the sector record format described abive is adopted, the control apparatus is connected to a host device or system such as a central processing unit or the like (not shown) by way of a bus 100 to which a bus interface circuit 7 is connected for controlling data transfer between the control apparatus and the host system. More particularly, for operation of the magnetic disc storage device, the bus interface circuit 7 is furnished with various control information, such as a read and/or write command, the address information, the number of data units to be transferred and others from the host system through the bus 100.

The bus interface circuit 7 has an internal bus a and a tag bus u connected thereto. Among the information received by the bus interface circuit 100, the control information such as data, address information and the like is transferred to a memory 1, an address register 2, a bus interface control circuit 8, a multiplexer 11 and so forth by way of the internal bus a, while a control signal is supplied to the bus interface control circuit 8 as a tag bus signal by way of the tag bus u.

The memory 1 may be constituted by a random access memory or RAM and serves for storing therein the control information for the sector which is characteristic of the illustrated embodiment of the present invention. The storage format of the memory 1 will be elucidated below in detail by referring to FIGS. 3A to 3D. It should be mentioned that the control information stored in the memory 1 includes such address information of the sector as described hereinbefore in conjunction with FIG. 1.

Referring to FIGS. 3A to 3D, when a read command is issued from the host syste, corresponding control information is stored in the memory or RAM 1 in a format illustrated in FIG. 3A. On the other hand, when a write command is issued, corresponding control information is stored in a format illustrated in FIG. 3B. When the concerned sector is defective, access is to be made to an alternate sector. To this end, the control information is stored in formats illustrated in FIGS. 3C and 3D in response to the read command and the write command, respectively. In any case, the control information is stored at the addresses covering the zeroth address ADR 'O' to a certain address. Further, a control bit T is employed in correspondence with each of the addresses. This control bit T serves to indicate whether or not the corresponding stored control information is to undergo a comparison operation as described hereinafter. More specifically, when the control bit T is logic "1", it means that the corresponding control information as stored is to undergo the comparison operation. On the other hand, if the control bit T is logic "0", the stored control information corresponding to this bit is not subjected to the comparing operation.

For example, in the case of the read operation, there are stored in the memory 1 the control code SYN 1 indicative of the leading end of the sector identifying address ID, the cylinder addresses HCA(H) and HCA(L) (where the attached symbols (H) and (L) represent bytes of more significance and less significance, respectively), the head address HA, the sector address HSA, a specific code X'FF' indicative of a change in the interface signal (where the attached symbol X means that 'FF' is of a hexadecimal value), the control code SYN 2 designating the leading of data and so forth at the associated addresses in this order, as is illustrated in FIG. 3A. In this connection, it is to be noted that the control information for the addresses such as HCA(H), HCA(L), HA, HSA and the like are loaded in the memory 1 in correspondence with the record format of the magnetic disc in concern every time the address retrieval operation is to be initiated for the concerned magnetic disc, while the other control information which is definitely determined in dependence on the record format of the magnetic disc storage has been previously loaded in the memory at a given time in the initial state of the magnetic disc storage.

On the other hand, when the sector located in an area designated by the host system is found defective and thus the alternate processing is executed, the address of the alternate sector is placed at the identifying address area ID of the defective sector so as to allow the access to the alternate sector to be made in accordance with that address. For the alternate processing, the control information is stored in the memory 1 in the manner illustrated in FIG. 3C. As can be seen from this figure, the contents of the control information stored in the memory 1 for the alternate processing differs from those shown in FIG. 3A in that the flag information FLG indicating that the sector in concern is in the defective state, the alternate cylinder address ACA(H) or ACA(L) of the alternate sector and the alternate sector address ASA of the alternate sector are additionally stored. Further, for the write operation, the individual control information is stored in the format illustrated in FIG. 3B. It will be seen that items or pieces of the control information stored in the format shown in FIG. 3C are substantially same as those illustrated in FIG. 3A for the read operation except that the data X'00' for the gap GAP to be written or the magnetic disc is additionally stored in the memory 1 for the write operation. More specifically, since the bit period of data recorded previously is asynchronous with the bit period of data to be written upon the write operation, there arises an irregularity of bit interval (i.e. bit splice) at the write initiating position. Thus, the write operation is effected starting from the part of the gap GAP in order to prevent occurrence of read error ascribable to the bit splice. On the other hand, when the sector in concern is found defective upon the write operation, the control information FLG, ACA(H) or ACA(L) and ASA is additionally stored in the manner illustrated in FIG. 3D for the same reason as described above in conjunction with the format shown in FIG. 3B.

It should hereat be mentioned that when the sector record format of the magnetic disc is altered, the order in which the control information, inter alia, the pattern contents of SYN 1 and SYN 2, HCA(H), HCA(L), HA, HSA and the like are stored in the memory as well as the number of the constituent bytes is also changed, as will be described in detail hereinafter. For example, in the case of a fixed head type magnetic disc memory, the address information such as HCA(H), HCA(L) and the like is absent in the format corresponding to the one shown in FIG. 3A and address information HA(H), HA(L) and HAS is stored at the addresses ADR "2" et seq. in this order.

Referring again to FIG. 2, the control information concerning the sector described above is loaded in the memory 1 through the internal bus a in response to a write signal w produced by the bus interface control circuit 8. The address of the memory 1 to be accessed is designated by the address register 2 which is connected to the internal bus a and in which the address is set through the internal bus a with the aid of an address set signal v outputted from the bus interface control circuit 8. The address register 2 is reset to the initial state in response to an address retrieval operation initiating signal b. Further, the value of the address is incremented in response to an address count-up signal $\overline{o}$ supplied from a comparison circuit described hereinafter.

The bus interface control circuit 8 mentioned above serves to control the data transfer effected between the magnetic disc and the host system. More particularly, the bus interface control circuit 8 functions to analyse the control information such as commands and the like supplied from the host system through the bus interface circuit 7 and the tag bus u and issue activating instructions in accordance with the results of the analyses. Additionally, the bus interface control circuit 8 performs analysis of signals supplied from circuits described hereinafter as well as the corresponding control functions. The signals for the instructions of activation include the address set signal v, the write signal w for commanding the write operation to the memory 1 and the address retrieval operation initiating signal b described above. These signals v, w and b are utilized for controlling the address register 2. The address retrieval operation initiating signal b is additionally supplied to a device interface circuit 9.

The device interface circuit 9 is connected to the magnetic disc storage (not shown) and serves to control interface signals transmitted between the present control apparatus and the magnetic disc storage device. More particularly, the device interface circuit 9 produces as output signals a control signal c for reading data recorded on the magnetic disc (this signal is also referred to as read gate signal) and a control signal d for writing data on the magnetic disc (this signal is also referred to as write gate signal), both of these signals c and d being supplied to the magnetic disc storage device. The signal c is additionally supplied to a flip-flop 5 and a shift register 3 described hereinafter, while the signal d is also supplied to the shift register 3. On the other hand, the magnetic disc storage device supplies to the input of the device interface circuit 9 a sector pulse signal e indicative of the leading end of each individual sector, a synchronizing timing signal f issued for the data read operation (this signal is also referred to as read clock signal) and a timing signal g for the data writing operation (this signal is also referred to as write clock signal).

Besides, the device interface circuit 9 produces a shift clock signal h in synchronism with either the read clock signal f or the write clock signal g as selected in dependence on the state of the read gate signal c. The shift clock signal h is then transferred to the shift register 3, a byte counter 10 and the comparison circuit 4. Additionally, a signal i indicative of a comparison period is produced by the device interface circuit 9 and supplied to the comparison circuit 4 as a check enable signal, when a predetermined time has elasped since generation of the read gate signal c supplied to the magnetic disc storage device. When a change in the device side interface is detected, a detection signal p is outputted from the comparison circuit 4 and supplied to both the device interface circuit 9 and the bus interface circuit 8.

The shift register 3 serves for serial/parallel conversion of data j read out from the magnetic disc and data k outputted from the multiplexer and to be written on the magnetic disc. More particularly, the data j read out from the magnetic disc is subjected to serial-to-parallel conversion and subsequently supplied to the comparison circuit 4 as a data signal y and additionally to a register 12 to be once loaded therein for subsequent transmission to the internal bus a, while the data outputted from the multiplexer 11 undergoes parallel-to-serial conversion and is thereafter supplied to the magnetic disc storage as the data k to be written therein.

The aforementioned control information stored in the memory 1 is sequentially read out under addressing by the address register 2 and sent to the comparison circuit 4 as a control information signal m and a control bit signal n (i.e. the control bit T). The comparison circuit determines the logical state of the control bit n and performs comparison of the control information m with the data y read out from the magnetic disc storage and supplied from the shift register 3, provided that the control bit n is logic "1". The comparison operation is effected on a byte-by-byte basis on the basis of either the shift clock signal h or the byte count signal l outputted from the byte counter 10 selected in dependence on the state of a detection signal s described hereinafter. The byte counter 10 counts the shift clock h and produces the byte count signal l when the read-out data amounts to one byte. When the control bit n is logic "0", no comparison operation takes place. In any case, the count-up signal $\overline{o}$ is produced in synchronism with the byte count signal l from the comparison circuit 4 for every execution of the comparing operation, whereby the address register 2 is updated.

When a coincidence is detected in the comparing operation in the logic "0" state of the detection signal s, a coincidence signal q is produced from the comparison circuit 4 and supplied to the aforementioned byte counter 10 and the flip-flop 5. In response to this coincidence signal q, the byte counter 10 is initialized, while the flip-flop 5 is set to thereby produce the detection signal s which indicates that the leading codes SYN 1 and SYN 2 of the sector address ID and the data DATA, respectively, are detected. The detection signal s is also supplied to the multiplexer 11 and the comparison circuit 4 in addition to the bus interface control circuit 8 described hereinbefore. The bus interface control circuit 8 monitors the signal s and produces the control signals for executing the next processing upon detection of the control codes SYN 1 and SYN 2. The multiplexer 11 selects either the control information m or data on the internal bus a in dependence on the detection signal s.

When non-coincidence has resulted from the aforementioned comparing operation, a non-coincidence signal r is outputted from the comparison circuit 4, as the result of which a flip-flop 6 is set to thereby produce a detection signal (also referred to as a skip signal) t which is then supplied to the bus interface control circuit 8. When the detection signal t of logic "1" is present at the output of the bus interface control circuit 8, it is determined by this circuit 8 that the concerned or desired sector has not been detected, whereupon the subsequent operation is immediately interrupted and the beginning of the address retrieval operation is restored. On the other hand, when the input detection signal t is logic "0", the bus interface control circuit 8 decides that the desired sector has been detected and allows the subsequent operation to be effected in succession.

When it is detected by the comparison circuit 4 that the control bit n is logic "0" and that the control information m is X'FF', it is determined that the change is to take place in the device interface, whereby the timing signal p is outputted from the comparison circuit 4 and supplied to the inputs of the device interface circuit 9 and the bus interface control circuit 8. In response to this timing signal p, the read gate signal c produced by the device interface circuit 9 is reset. At the same time, the bus interface control circuit 8 initiates the operation for detecting the logic state of the output signal from the flip-flop 6.

Figure 4:
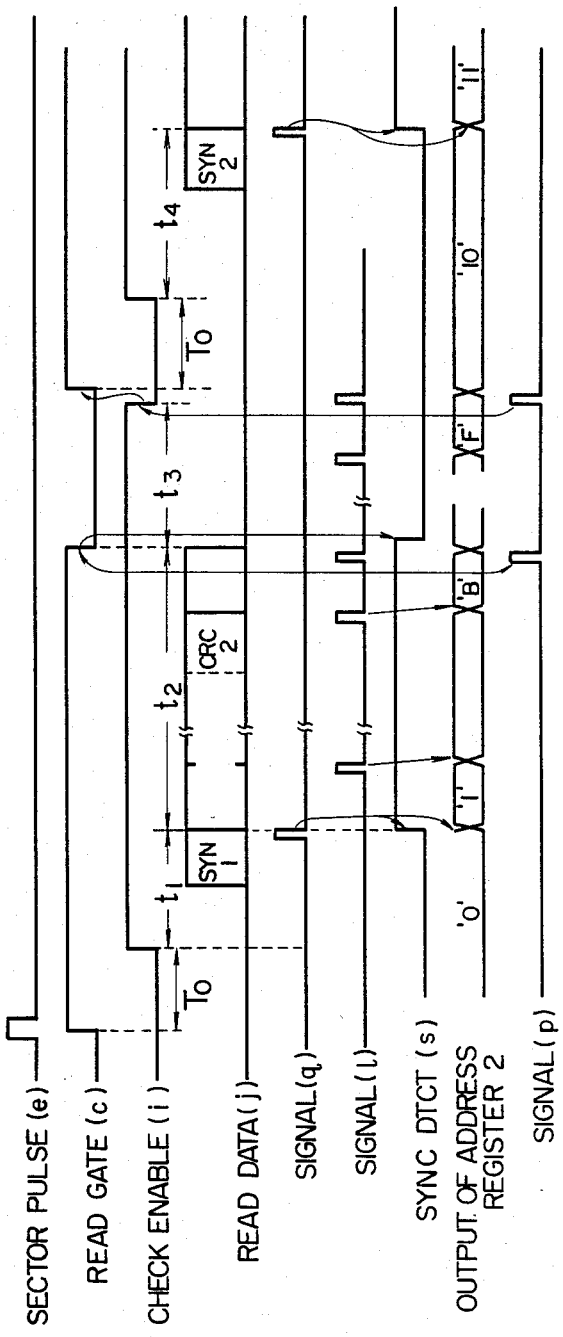
FIGS. 4 and 5 show time charts for illustrating operation of the control apparatus according to the invention.
Figure 5:
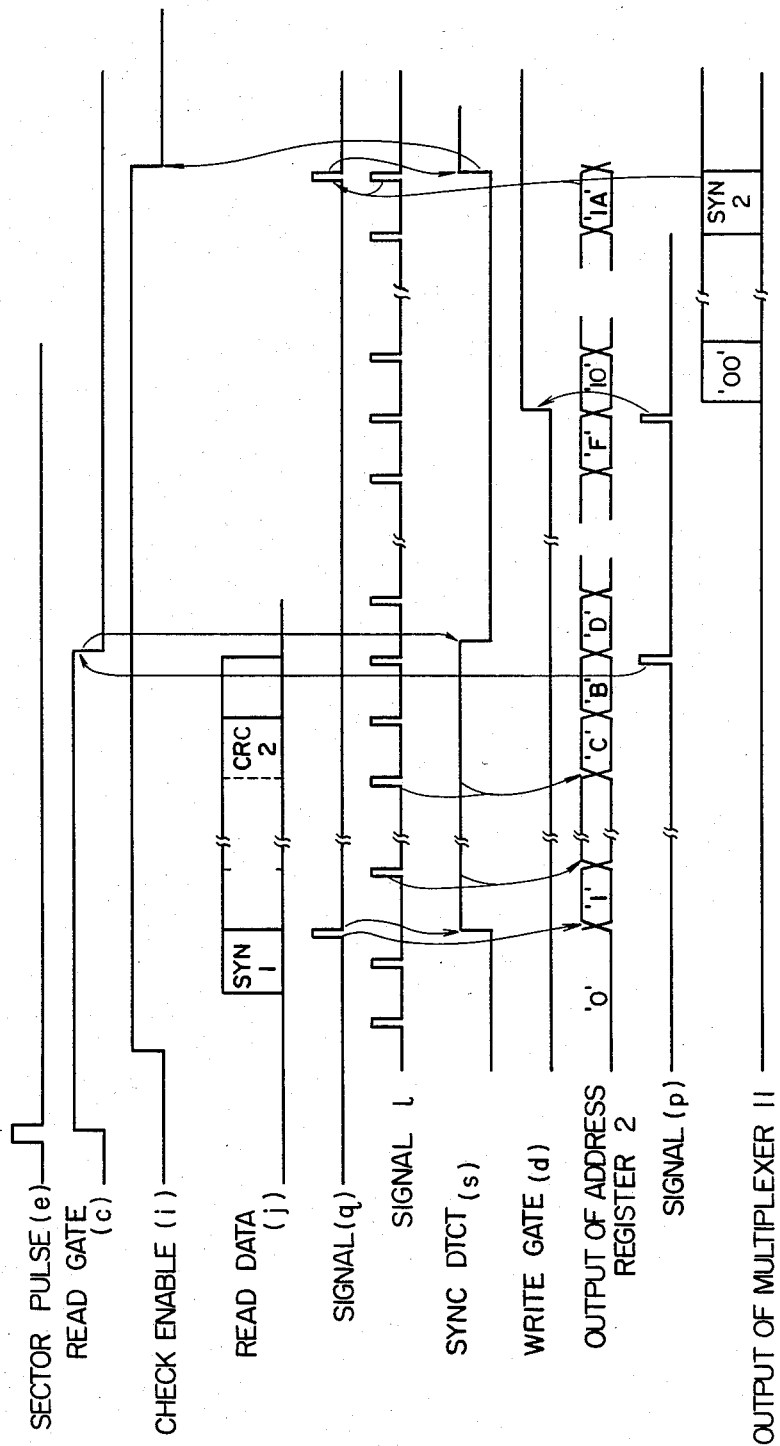

Next, operation of the control apparatus of the arrangement described above will be elucidated in more detail with the aid of time charts illustrated in FIGS. 4 and 5 on the assumption that the sector record format of the composition illustrated in FIG. 1 is adopted in the magnetic disc storage. In dependence on whether the read operation or the write operation is to be made to the magnetic disc storage, the bus interface control circuit 8 is at first supplied with command information and address information for the sector from the host system by way of the bus 100, the bus interface circuit 7 and the internal bus a. The address information transferred from the host system has a format corresponding to the one shown in FIG. 1. Upon completion of the transfer of the address information, the operation activating or starting signal is supplied to the bus interface control circuit 8 from the bus interface circuit 7 through the tag bus u, whereby the address retrieval operation is carried out to effect the read or the write operation. When the read command is supplied to the bus interface control circuit 8, the read operation is performed to the magnetic disc storage.

In the first place, the manner in which the read operation is performed will be described by referring to FIG. 4. In response to the tag bus signal u, the address retrieval operation is first initiated. However, the address set signal v and the memory write signal w are produced by the bus interface control circuit 8 in precedence to the initiation of the address retrieval operation. As a consequence, the leading address is set into the address register 2 through the internal bus a and sequentially updated to designate the addresses of the memory 1 at which the control information concerning the addresses such as the cylinder address HCA(H) or HCA(L), the head address HA, the sector address HSA and the like are stored in the format illustrated in FIG. 3A. The control information such as the codes SYN 1, X'FF', SYN 2 and the like, i.e. the control information other than those of the addresses has previously been stored at the associated addresses under the control of the bus interface control circuit 8. When all the control information has been stored in the memory 1 in the manner shown in FIG. 3A, the bus interface control circuit 8 then issues the address retrieval operation initiating signal b to the device interface circuit 9 and the address register 2. In response to this signal b, the address register 2 is reset and the control information stored at the address ADR '0' of the memory 1, i.e. the control information SYN 1 is read out as the signal m which is then inputted to the comparison circuit 4.

On the other hand, the address retrieval initiating signal b causes operation of the device interface circuit 9 to be started. Needless to say, the magnetic disc is being rotated at this time point, whereby the sector pulse signal e indicative of the leading end of the sector in question is supplied to the device interface circuit 9 from the magnetic disc equipment. Starting from this time point, the read gate signal c for reading out information stored on the magnetic disc is issued to the magnetic disc device. In response to the signal c, the read data j is sequentially outputted from the magnetic disc device and loaded into the shift register 3, while the timing signal (also referred to as read clock signal) f which is in synchronism with the read data j is supplied to the input of the device interface circuit 9. Further, so long as the read gate signal c is outputted from the device interface circuit 9, the shift clock signal h is supplied from the device interface circuit 9 to the shift register 3 and the byte counter 10 in synchronism with the read clock signal f. Each individual sector of the magnetic disc has data stored in the format shown in FIG. 1. The read data j is serially transferred to the shift register 3, as is illustrated in FIG. 4, and shifted through the shift register 3 in synchronism with the shift clock h to undergo the serial-to-parallel conversion, resulting in the data signal y having a predetermined byte length being produced from the shift register 3 and transferred to the comparison circuit 4 and the register 12.

When a predetermined duration $T_o$ (refer to FIG. 4) has elapsed after the read gate signal c was produced, the device interface circuit 9 produces the check enable signal i indicative of the duration of the comparing operation, which signal i is supplied to the comparison circuit 4. The time $T_o$ represents a period which succeeds the initiation of the disc read operation and during which the operation is still unstable.

When the check enable signal i is issued, the output signal from the address register 2 designates the address ADR '0'. Accordingly, the control information SYN 1 and the control bit are supplied from the memory 1 to the comparison circuit 4 as the input signals m and n, respectively. Since the control bit n is logic "1" at that time, the control information signal m is compared with the read data signal y supplied from the shift register 3. In the meantime, the output signal s of the flip-flop 5 remains logic "0". The comparison circuit 4 performs the comparing operation for every one-bit data transferred from the magnetic disc device under the timing of the shift clock signal h.

When coincidence is found as the result of the comparison mentioned above, a signal g (FIG. 4) indicating that the leading end of the sector address ID is produced and supplied to the flip-flop 5 which is thereby set and produces the detection signal s (SYNC DTCT) indicating that the leading end of the sector address ID is detected.

At the same time, the address count-up signal $\bar{o}$ is supplied to the shift register 2 from the comparison circuit 4, whereby the contents of the address register 2 is incremented by 1 (one). Then, the address ADR'1' of the memory 1 is accessed.

By the way, the aforementioned coincidence signal g is also supplied to the byte counter 10 which is then initialized. Subsequently, the counter 10 supplies the byte counter signal l to the comparison circuit 4 for every one byte of the read data y. Thereafter, during a period $t_2$, the comparison circuit 4 performs the comparing operation on a one-byte basis for every input signal l.

More particularly, when the signal n outputted from the memory 1 is logic "0", comparison of the signal m with the signal $\underline{y}$ is not effected, resulting in only the count-up signal $\bar{o}$ being outputted in synchronism with the byte count l to thereby effect the updating of the address register 2. On the other hand, when the signal n is logic "1", the signal m is compared with the signal y, whereby the content of the address register 2 is updated by the address count-up signal $\bar{o}$ upon completion of the comparing operation. If the comparison results in non-coincidence, the non-coincidence signal r is produced simultaneously with the updating of the address register 2, and the flip-flop 6 is set by the non-coincidence signal r.

The comparing operation mentioned above is repeated until a time point at which the signal n is logic "0" and the signal m has the content equal to X'FF', i.e. when the address ADR'B' is reached by the address register 2, whereupon the comparison circuit 4 detects the transition or change-over in the device interface concurrently with the inherent comparing operation to thereby produce the timing signal p. The timing signal p is inputted to the device interface circuit 9, whereby the read gate signal c is reset by this timing signal p. Further, the timing signal p is also supplied to the bus interface control circuit 8, whereby the bus interface control circuit 8 can now make a decision as to whether the aimed desired sector has been retrieved or not by detecting the state or level of the output signal t of the flip-flop 6 with the aid of the signal p. More specifically, when the detected signal t is logic "1", any further operation is immediately interrupted as the sector is not the desired one, whereby the address retrieval operation is returned to the beginning. On the contrary, when the signal t is logic "0", this means that the desired sector has been detected. Subsequent operation is thus allowed to be carried out in succession. In this case, since the read gate signal c is reset, the timing signal g for the write operation of data is generated by the magnetic disc device in place of the read clock signal f and applied to the input of the device interface circuit 9 which then produces the shift clock signal h in synchronism with the timing signal g. At that time, the comparison circuit 4 performs the same operation as carried out during the period $t_2$. However, since the signal n is logic "0", the operation of the comparison circuit 4 results only in that the address register 2 is updated in response to the address count-up signal $\bar{o}$. In the course of operation, the comparison circuit 4 detects that the signal n is logic "0" and that the signal m has the content equal to X'FF' at a time point when the content of the address register 2 has reached the address ADR'F', resulting in the timing signal p is being again produced (refer to the period $t_3$ shown in FIG. 4). Thus, the check enable signal i is reset at that time point. When this signal i is reset, the read gate signal c is again produced by the device interface circuit 9, whereby the retrieval operation of the code SYN 2 is carried out during a period $t_4$ shown in FIG. 4. The operation for detecting the code SYN 2 is same as the operation effected until the detection of the control code SYN 1, and the coincidence signal g is outputted upon detection of SYN 2. Operation of the comparison circuit 4 comes to an end when the signal s indicating that the leading portion of data DATA is detected is produced.

Subsequently, the data y outputted from the shift register in succession to the detection of SYN 2 is temporarily stored in the register 12 and then transferred to the upper or host system by way of the internal bus a, the bus interface circuit 7 and the bus 100 under the control of the bus interface control circuit 8.

In conjunction with the read operation described above, it is assumed that the sector to be accessed is defective and that an alternate sector is established, as is illustrated in FIG. 3C. Under these conditions, the bus interface control circuit 8 stops accessing the defective sector by reading the address information ACA(H), ACA(L) and ASA of the alternate sector at a time point when it is determined that the desired sector is defective on the basis of the presence of the flag FLG. As a consequence, the operation for reading data of the alternate sector is caused to take place. The reading operation itself is similar to the one described above.

Next, the write operation to the magnetic disc storage device will be described by referring to the time chart shown in FIG. 5. The write operation is activated upon application of the write command to the bus interface control circuit 8. In the case of the write operation, the procedure taken until the address retrieval operation has been accomplished is the same as in the case of the read operation. Accordingly, repeated description will be unnecessary.

When the desired sector on the magnetic disc is detected, the comparison circuit 4 produces the timing signal p. In this case, the check enable signal i is not reset, and the control signal for writing data on the magnetic disc device, i.e. the write gate signal d is outputted by the device interface circuit 9. Subsequently, the control information read out from the memory 1 is supplied to the multiplexer 11 as the signal m. At that time, the multiplexer 11 selects the channel for the signal m in response to the signal s. Thus, the signal m outputted from the memory 1 is loaded into the shift register 3 to undergo a parallel-to-serial conversion. The serial output signal from the shift register 3 is then transferred to the magnetic disc device as the data k to be written. In the meantime, the check enable signal i remains logic "1". Accordingly, as long as the control bit signal n is logic "0", the address register 2 is successively updated to thereby allow the write operation of the signal m onto the magnetic disc to be repeated. When the content of the address register 2 becomes X'IA', the signal n is logic "1", whereby the contents carried by the signal m at that time point, i.e. information SYN 2 is placed in the shift register 3 through the multiplexer 11. At the same time, the comparison circuit 4 produces the coincidence signal g, resulting in the flip-flop 5 being set, which then produces the detection signal s indicating that the code SYN 2 is detected.

At the time point when the above detection signal s is produced, the operation of the comparison circuit 4 is completed, while the multiplexer 11 is changed over so as to select the internal bus a. Data transferred subsequently from the host system is loaded in the shift register 3 by way of the bus interface circuit 7, the internal bus a and the multiplexer 11. In the shift register 3, data undergoes the serial-to-parallel conversion and is transferred to the magnetic disc device as the data signal k to be written in the appropriate sector.

In the case where the alternate sector is set in the memory 1, as is illustrated in FIG. 3D, substantially the same operation as described hereinbefore in conjunction with FIG. 3C is carried out except that the operation concerns the writing of data in the magnetic disc device as described just above.

In the foregoing description, it has been assumed that the sector record format shown in FIG. 1 is adopted in the magnetic disc storage device in question. In this connection, it is to be noted that when the magnetic disc having the sector of a record format different from the one shown in FIG. 1 is connected to the device interface circuit 9 shown in FIG. 2, the control information to be stored in the memory 1 also becomes different in correspondence with the adopted record format, although the read operation and the write operation themselves remain essentially unchanged.

For example, in the case of a known magnetic disc storage of the fixed head type, the cylinder addresses HCA(H) and HCA(L) are absent. Accordingly, when the magnetic disc device of this type is connected to the device interface circuit 9, the control information including the address information such as the head address HA(H) or HA(L), the cylinder sector address HSA and the like is supplied from the host device by way of the bus 100, the bus interface circuit 7 and the internal bus a to the memory 1 to be stored therein at the predetermined addresses.

It is determined by the bus interface control circuit 8 what type of record format is adopted in the sector of the magnetic disc device connected to the device interface circuit 9. The control information corresponding to the determination of the bus interface control circuit 8 is supplied from the host system and stored in the memory 1.

In the foregoing, an exemplary embodiment of the invention has been disclosed. However, it goes without saying that various modifications may readily occur to those skilled in the art without departing from the spirit and scope of the invention. For example, in the case of the illustrated embodiment, the control information is transferred from the host system to the memory 1 to be stored therein in response to every read command and write command. However, it is equally possible to arrange that all the control information is previously stored in the memory 1. In that case, the contents of the memory 1 are of course altered correspondingly when the sector record format of the magnetic disc device connected to the device interface circuit 9 is changed.

In another modified embodiment in which a plurality of magnetic discs having different sector record formats are connected to the device interface circuit 9, the control information corresponding to the different sector record formats may be stored in the memory 1, to thereby effect the sector retrieval operations for the mangetic disc devices in question in accordance with the respective control information in manner similar to that described herein.

We claim:

1. A control apparatus for a rotation type storage device which is divided into a plurality of regions each of which has an address area, serving for recording control information concerning addresses and an indication of the leading part of the region, and a data area serving for recording data, comprising:
   (a) memory means for storing control information which includes addresses and indication of the leading part of a region to be accessed;
   (b) register means for storing temporarily therein control information read from said address area in a region;
   (c) comparison means for comparing said control information read out from said memory means with said control information from said register means; and
   (d) control means for controlling said data area to be accessed in accordance with the result of comparison effected by said comparison means.

2. A control apparatus according to claim 1, wherein a control bit which serves for comparing said first and second control information is stored in said memory means, and said comparison means compares said control information read out from said memory means in accordance with an indication of said control bit.

3. A control apparatus according to claim 1, further including counter means for counting a shift pulse which serves for shifting said first control information in said register means, wherein said comparison means compares said first and second control information when said counter counts to a predetermined value.

4. A control apparatus according to claim 1, further including bus means for transmitting said control information and said data which are read and written from/to the storage device, and switching means for switching said bus means to said register means in accordance with the indentification of said indication of the leading information by said comparison means.

5. A control apparatus according to claim 1, further including a control circuit for inhibiting comparing in accordance with non-identifying of the comparison by said comparison means.

6. A control apparatus for a rotation type storage device which is divided into a plurality of sectors each of which includes an address area serving for recording the first information of the address assigned thereto, and a data area serving for recording data, comprising:
   (a) a bus connected to a host system and transferring at least read/write commands and second control information including addresses and an indication of the leading part of a sector to read and to be written from/into said data area of said sector;
   (b) bus interface control means for analyzing the command transferred by said bus;
   (c) memory means for storing said second control information in accordance with the result of the analysis of the command by said bus interface control means;
   (d) means including a shift register for storing temporarily therein said first information read from said address area;

(e) comparison means for comparing said first information read out from said shift register with said second control information read out from said memory means;

(f) an internal bus for transferring at least said second control information and said data read from and written into said data area; and (g) selecting means for selecting said second control information read out from said memory means or the data from said internal bus in accordance with the result of the comparison effected by said comparison means.

7. A control apparatus according to claim 1, wherein said memory means stores a control bit to indicate wherther or not said second control information is to be compared, and said comparison means compares the relevant second control information with reference to said control bit.

8. A control apparatus according to claim 6, further including a counter to count in synchronism with a shift pulse to shift information within said shift register, comparison being made by said comparison means each time said counter counts a predetermined value.

9. A control apparatus according to claim 6, wherein said indication of the leading part of a sector is previously stored in said memory means.

10. A control apparatus according to claim 6, wherein, when said indication of the leading part of a sector is identified by said comparison means, said selecting means selects said internal bus and data transfer is made between said shift register and said internal bus.

11. A control apparatus according to claim 6, wherein, when said first information and said second control information are not identical as a result of comparison by said comparison means, said bus interface control means functions to interrupt the subsequent comparing operation.

12. A control apparatus according to claim 6, further including a device interface circuit with which a storage device with any recording format is coupled, the second control information inherent to a recording format being transferred from said host system to be stored in said memory means.

13. A control circuit for a magnetic recording device which includes a plurality of sectors each of which has a data area serving for recording data, and an address area serving for recording the first control information including addresses to define a recording format of the sector and indication of the leading part of said data area and said address area, wherein the data read from or written into a data area within said device is transferred to or from a host system via an internal bus, comprising:

(a) memory means for storing second control information which includes addresses to define a recording format of the sector to be accessed and indication of the leading part of said data area and said address area to be accessed, and for storing a control bit to determine whether said second control information should be compared;

(b) an address register for designating the address of said memory in order for said second control information and said control bit to be read out of said memory or to be written therein;

(c) converting means for serial/parallel conversion of said data or said second control information transferred via said internal bus to be written into a sector of said magnetic recording device, and for parallel/serial conversion of said data or said first control information read out of a sector of said magnetic recording device;

(d) comparator means for comparing said second control information outputted from said memory with said first control information transferred from said converting means when said control bit outputted from said memory means indicates the comparisong to be required;

(e) selecting means for transferring the data from said internal bus to said converting means or from said converting means to said internal bus in accordance with the coincidence of the indication included in said first and said second control information compared by said comparator means; the address in said address register being readdressed to output, from said memory means, said second control information which is compared successively with said first control information by said comparator means, resulting in that the subsequent comparison is interrupted if said first and said second control informations are not coincident.

* * * * *